United States Patent [19]

Nakamura

[11] 4,140,063
[45] Feb. 20, 1979

[54] ELECTROMAGNETIC SUSPENSION AND GUIDE SYSTEM FOR MAGNETICALLY SUSPENDED VEHICLE

[75] Inventor: Shinji Nakamura, Kawasaki, Japan

[73] Assignee: Japan Airlines Co., Ltd., Tokyo, Japan

[21] Appl. No.: 785,538

[22] Filed: Apr. 7, 1977

[30] Foreign Application Priority Data

Feb. 26, 1977 [JP] Japan .................................. 52-20547

[51] Int. Cl.² ............................................ B61B 13/08
[52] U.S. Cl. ............................................ 104/148 MS
[58] Field of Search ................. 104/148 LM, 148 MS, 104/148 SS; 308/10; 310/12, 13

[56] References Cited

U.S. PATENT DOCUMENTS

| 3,797,403 | 3/1974 | Schwarzler et al. | 104/148 MS |
| 3,834,318 | 9/1974 | Fellows et al. | 104/148 MS |
| 3,999,107 | 12/1976 | Reuting | 310/12 X |

FOREIGN PATENT DOCUMENTS 2311411  9/1974  Fed. Rep. of Germany ... 104/148 MS

*Primary Examiner*—Barry L. Kelmachter
*Attorney, Agent, or Firm*—Armstrong, Nikaido, Marmelstein & Kubovcik

[57] ABSTRACT

An electromagnetic suspension and guide system for a magnetically suspended vehicle comprises an armature rail of three-legged shape in cross section fixedly mounted on a rail support laid on the ground, and an electromagnet core of three-legged shape in cross section fixedly mounted on a magnetically suspended vehicle and disposed so that the three legs thereof are in an opposing relationship to the three legs of the armature rail with a gap therebetween, respectively. The three-legged electromagnet core has a different width from that of the three-legged armature rail, and the two side legs of the core are provided with windings wound thereon, respectively. The suspending and guiding operations of the vehicle are controlled by controlling the energizing currents supplied to the electromagnet. An electrical control circuit for producing such energizing currents includes a detector for determining the vertical and lateral positions of the electromagnet core relative to the armature rail, an amplifier connected to the detector, and a current controller responsive to the output signals from the amplifier for producing the energizing currents.

7 Claims, 15 Drawing Figures

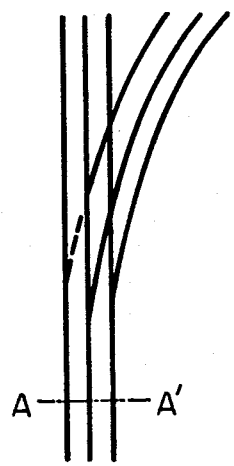
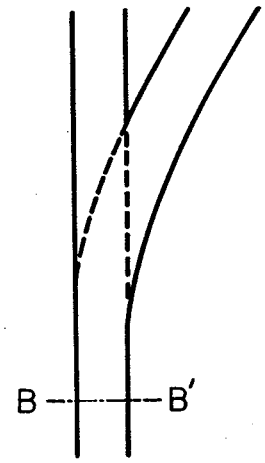
Fig. 6 (a)　　　Fig. 7 (a)
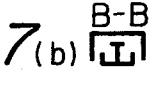
Fig. 6(b)　　　Fig. 7(b)
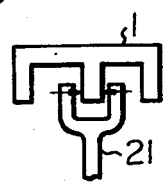
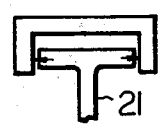
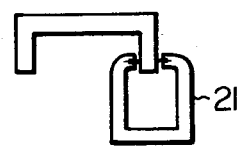
Fig. 8(a)　Fig. 8(b)　Fig. 8(c)

ELECTROMAGNETIC SUSPENSION AND GUIDE SYSTEM FOR MAGNETICALLY SUSPENDED VEHICLE

This invention relates in general to an electromagnetic suspension and guide system for a magnetically suspended vehicle, and more particularly to a control system for controlling the electromagnetic suspending and guiding operations of such vehicle.

In the past, there has been known an electromagnetic suspension and guide system for a magnetically suspended vehicle wherein the vehicle is provided with an electromagnet for suspending the vehicle and a separate electromagnet for guiding the vehicle, these electromagnets being secured to the vehicle in such a manner that they are positioned to face an armature rail of ferromagnetic material laid on the ground, energizing currents supplied to these electromagnets are controlled so that the vehicle is kept magnetically suspended or floated and at the same time guided in the lateral direction with respect to the armature rail, and the vehicle thus suspended or floated and guided is moved along the armature rail by a propelling force such as given by a linear motor being secured to the vehicle. However, in such known system, it is naturally inevitable that the overall weight of the magnetically suspended vehicle becomes too heavy due to the necessity of using a separate electromagnet for guiding the vehicle in addition to an electromagnet for floating the same.

Also, as disclosed in the Official Gazette for Japanese Patent Application Public Disclosure No. 16323/1973, there has been proposed an electromagnetic suspension and guide system which employs a plurality of electromagnets secured to the vehicle and disposed in zigzag or alternately staggered fashion with respect to an armature rail of inverted-U shape in cross section in an attempt to eliminate the need of additional guide electromagnet.

However, this known system has the drawback that there occurs eddy currents in the armature rail due to the fact that the direction in which the magnetic fluxes generated by the electromagnets intersect the opposing armature rail may change alternatively as the vehicle is moved along the rail, thus applying an increased magnetic drag force to the vehicle, and furthermore, there is the problem that there occur yawing and pitching moments about the center point between the electromagnets disposed in zigzag fashion during running of the vehicle.

Moreover, there has been disclosed another system in the Official Gazette for Japanese Patent Application Public Disclosure No. 16322/1973 wherein the vehicle is provided with an electromagnet core of inverted-T shape in cross section which is disposed in the groove of an armature rail of inverted-U shape in cross section in an attempt to have electromagnets for suspending and guiding purposes integrated as a unit.

However, this known system has the disadvantage that because the upper part of the electromagnet core comes deeply into the inside of the armature rail groove, there is naturally a substantial restriction on the movability or allowance in lateral movement of the electromagnet core, and, particularly when an electromagnet core of a relatively long dimension is used, it is impossible to make the curvature of the armature rail large in an area where the rail is to be curved, since the distance or gap between the electromagnet core and the armature rail will become unduly small or the core would even contact with the rail. Furthermore, this known system has the disadvantage that when an uncontrolled constant energizing current is supplied to the windings of the guide magnet, or when control is made only in the vertical direction by the suspension magnet, there is produced no such automatic restoring force as to restore and keep the electromagnet core at its neutral lateral position, and, further, unless lateral control of the electromagnet core is positively made at all times, the lateral stability of the electromagnet core would be lost and the core would be deflected undesirably toward either lateral direction. In addition, this known system has the disadvantage that unless particular means are provided to assure the lateral stability of the vehicle at a switch area where the armature rail diverge or converge, the ability of the system to make lateral control of the vehicle would be lost.

In consideration of such defects and disadvantages of the prior arts as mentioned above, it would be advantageous if any improvement can be made available to overcome and obviate such defects.

Therefore, it is a primary object of the invention to provide an improved electromagnetic suspension and guide control system for magnetically suspended vehicles which incorporates an integrally constructed electromagnet adaptable for both suspension control and lateral guide control purposes.

It is another object of the invention to provide an improved electromagnetic suspension and guide control system which requires a relatively small number of components, thus affording a relatively light overall weight of such vehicle.

It is still another object of the invention to provide an improved electromagnetic suspension and guide control system which exerts only a relatively smaller magnetic drag force to the vehicle and produces substantially no yawing moment in the vehicle even when it is controlled in the lateral direction during running thereof along an armature rail.

It is a further object of the invention to provide an improved electromagnetic suspension and guide control system wherein the electromagnet secured to the vehicle can be moved over a relatively wide range in the lateral or transverse direction.

It is a still further object of the invention to provide an improved electromagnetic suspension and guide control system wherein the magnetically suspended vehicle has an automatic restoring force in the lateral direction despite the fact that the vehicle is controlled only in the vertical direction.

It is a further object of the invention to provide an improved electromagnetic suspension and guide control system which consumes a relatively small quantity of electric power during operation.

These object are attained, in accordance with the invention, by an improved electromagnetic suspension and guide control system wherein an elongated armature rail fixedly mounted along a track along which a magnetically suspended vehicle is to travel and an electromagnet core secured to the vehicle and disposed in an opposing relationship to said armature rail are both designed to have a three-legged shape in cross section but different widths from each other, and at least the side legs of the electromagnet core are provided with control windings wound thereon, respectively, so that the guiding of the vehicle in lateral direction as well as the vertical gap between the electromagnet core and the armature rail can be controlled by controlling the energizing currents supplied to the windings wound on the legs of the electromagnet core. Since the electromagnet core and the opposing armature rail have different widths, there is produced a lateral component in the electromagnetic force developed between the legs of the electromagnet core of the vehicle and the legs of the armature rail when the windings of the electromagnet are energized. As examples of extreme cases, when the number of lines of magnetic flux passing through the right side leg of the electromagnet core is maximum and the number of lines of magnetic flux passing through the left side leg thereof is minimum, the force applied to the electromagnet core is such that the right side leg of the electromagnet core comes closest to the right side leg of the armature rail. On the contrary, when the number of lines of magnetic flux passing through the left side leg of the electromagnet core is maximum and the number of lines of magnetic flux passing through the right side leg thereof is minimum, the force applied to the electromagnet core is such that the left side leg of the electromagnet core comes closest to the left side leg of the armature rail. In all cases, the controlling of the number of lines of magnetic flux passing through the right and left side legs of the electromagnet core is made in such a manner that the overall upward force applied to the vehicle is kept substantially unchanged in order to keep the vehicle suspended at a preselected height. Thus, the electromagnet secured to the vehicle can perform the function of controlling the guiding of the vehicle in the lateral direction, in addition to its ordinary function of controlling the gap between the electromagnet core and the armature rail.

In another embodiment of the invention, the central leg of the electromagnet core is also provided with windings wound thereon for controlling chiefly the upward suspending or lifting force applied to the electromagnet core and hence to the vehicle which secures the core.

Means are provided for controlling the energizing currents supplied to the windings of the electromagnet. Such current controlling means may include a gap detector for determining the distance between the armature rail and the electromagnet core and/or another gap detector for determining the lateral position of the electromagnet core relative to the armature rail, and electrical circuit means for determining the magnitude of currents to be supplied to the windings of the electromagnet.

The nature, principle, and details of the present invention as well as further objects and advantages thereof will become more apparent from the following detailed description with respect to preferred embodiments of the invention when read in conjunction with the accompanying drawings, in which like parts are designated with like reference numerals.

Figure 2:
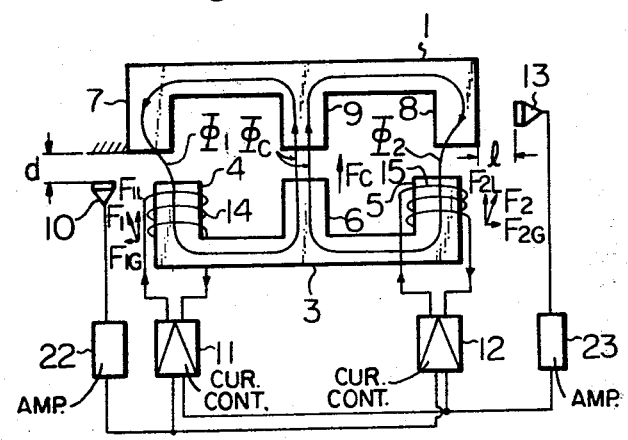
FIG. 2(a) is a schematic diagram showing a preferred embodiment of the invention.
FIG. 2(b) shows one example of the electrical control circuit used in the arrangement of FIG. 2(a)
Figure 2:
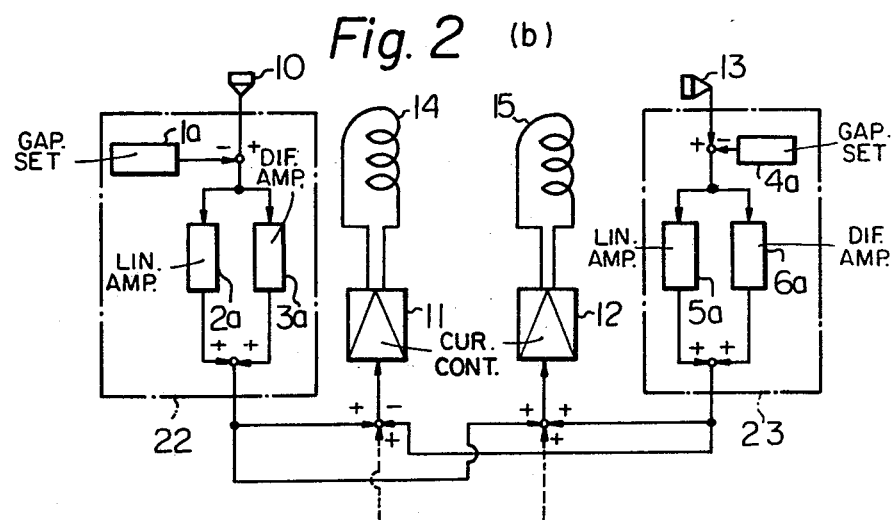
Figure 3:
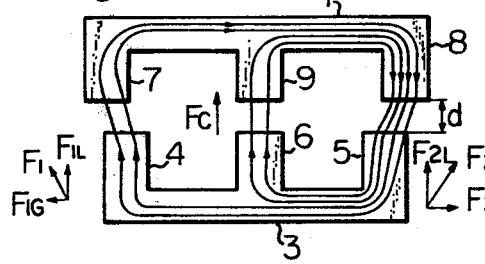
Figure 3:
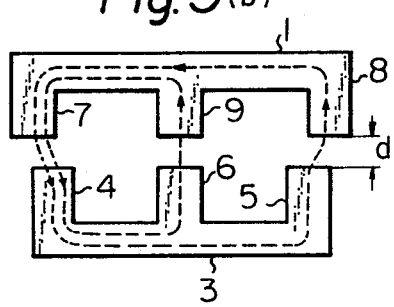
Figure 3:
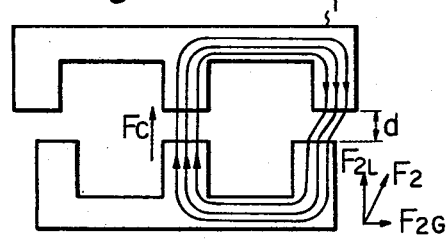
Figure 4:
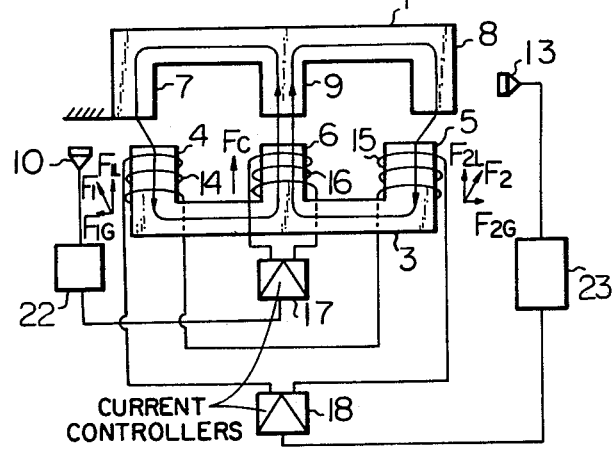
Figure 5:
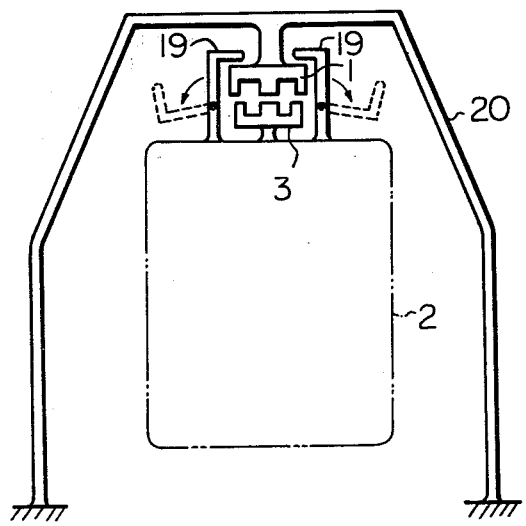

FIG. 3(a) through (c) are diagrammatic views illustrating how the control operation can be effected in the lateral direction of the electromagnet core shown in FIG. 2(a) in accordance with the invention;

FIG. 4 is a schematic diagram showing another embodiment of the invention;

FIG. 5 is a diagrammatic view, in vertical section, showing how the invention can be applied to a suspended type of vehicle;

FIG. 6(a) is a view illustrating the arrangement of the armature rail according to the invention in a switching area thereof;

FIG. 6(b) is a vertical cross-sectional view taken along line A-A' of FIG. 6(a);

FIG. 7(a) is a view illustrating the arrangement of an exemplary armature rail according to a prior art in a switching area thereof;

FIG. 7(b) is a vertical cross-sectional view taken along line B-B' of FIG. 7(a);

FIG. 8(a) is a diagrammatic cross-sectional view illustrating a mode of using of a part of the armature rail according to the invention as a mechanical brake for the vehicle; and FIG. 8(b) and (c) are diagrammatic cross-sectional views illustrating modes of using of prior art armature rails as mechanical brakes, respectively.

In the accompanying drawings, there are shown, for illustrative purposes only but not in any way for limitations, preferred embodiments of the improved electromagnetic suspension and guide control system according to this invention.

Description will now be given as to the typical preferred embodiments of the invention in conjunction with the accompanying drawings.

Figure 1:
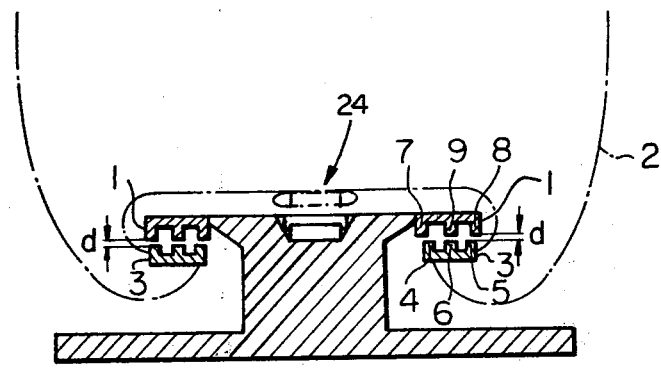
FIG. 1 is a vertical cross-sectional view showing the case where the invention is applied to a magnetically suspended vehicle having two rows of electromagnet cores secured thereto near its lower end portions and allowed to travel along a track having two opposing rows of armature rails.

Referring to FIG. 1, a pair of electromagnet cores 3 each having a three-legged shape in cross section and fixedly mounted on a magnetically suspended vehicle 2 are positioned to face a pair of armature rails 1 of ferromagnetic material laid on the ground by means of a rail support (not numbered) with a preselected gap "d" therebetween. Although the drawing shows only one electromagnet core on each side of the rail support, it is to be noted that the vehicle 2 may be provided with a plurality of such electromagnet cores along the length thereof. The electromagnet core 3 has side legs 4, 5 and a central leg 6 while the armature rail 1 has side legs 7, 8 and a central leg 9, as shown.

According to the invention, the width of the electromagnet core 3 is made smaller or greater than that of the armature rail 1 (FIG. 1 shows, by way of example, an electromagnet core 3 having a smaller width than that of the armature rail 1), and the central leg 6 of the core 3 is positioned to face the central leg 9 of the armature rail 1. There are wound windings on side legs 4, 5 of the core 3, as described later in conjunction with FIG. 2, and there is also wound a winding on the central leg 6 thereof as will be further described in connection with FIG. 4. When energizing currents are supplied to these windings, magnetic fluxes are produced which pass through a magnetic circuit comprising the armature rail 1. By controlling the magnitude of the energizing currents supplied to the electromagnet core windings, the electromagnetic attractive force between the electromagnet core 3 and the rail 1 can be adjusted to control the suspending and lateral guiding of the vehicle. The vehicle 2 thus electromagnetically suspended may be driven longitudinally along the armature rail by a separate propelling means such as linear motor arrangement 24. Because the essence of the invention is concerned with how to control the suspending or lifting and lateral guiding of the vehicle, and not with how to propel it along the length of the rail, such propelling means will not be explained in detail.

FIG. 2(a) is a schematic diagram of one example of the electromagnetic suspension and guide control system according to the invention wherein the electromagnet core 3 has a smaller width than that of the armature rail 1 and is provided with windings wound only on its side legs, showing that the core 3 is in its neutral position and is located to face the armature rail 1 with a given gap "d" therebetween. FIG. 2(b) shows one example of an electric control circuit which can be used in the arrangement of FIG. 2(a). FIG. 3(a) through (c) diagrammatically illustrate how a lateral control force is exerted on the electromagnet core 3 by changing the state of energization of the windings wound on the side legs of the core 3.

In the arrangement shown in FIG. 2(a), in order to maintain a preselected width "d" of the gap between the electromagnet core 3 and the armature rail 1, a vertical gap detector 10 having a fixed relationship to the core 3 produces an electrical signal corresponding to a vertical deviation of the core 3 from the armature rail 1 and supplies it to an operational amplifier circuit 22. The output signal from the operational amplifier circuit 22 is applied to respective current controllers 11, 12 which provide energizing currents to the windings 14 and 15 on the side legs of the core 3, respectively.

With the arrangement shown in FIG. 2(a), even if control is effected only in the vertical direction, there is produced an automatic restoring force which tends to restore the electromagnet core 3 to its neutral position in case the core has been deflected in either lateral direction, because, in such case, the direction of the flux $\Phi c$ passing through the central leg 6 of the core 3 is tilted relative to the vertical and because the horizontal components F1g., F2g of the forces F1, F2 developed respectively by the magnetic fluxes $\Phi 1$, $\Phi 2$ passing through the left and right side legs 4, 5 of the core 3 vary. But, in order to provide a positive lateral control effect on the core 3 in addition to this automatic restoring effect, there is provided a second gap detector 13 having a fixed relationship to the core 3 and adaped to detect the lateral position of the electromagnet core 3 with respect to the armature rail 1. The gap detector 13 produces an electrical signal corresponding to a lateral deviation of the core 3 relative to the armature rail 1 and applies it to an operational amplifier circuit 23, the output signal from which is applied to the current controllers 11, 12, thus changing the energizing currents supplied to the windings 14, 15 wound on the side legs of the core 3. Thus, the energizing current obtained in accordance with the lateral deviation of the core 3 relative to the armature rail 1 is superposed on the energizing current obtained in accordance with the vertical deviation of the core 3 from the rail 1 and the resultant signal is supplied to the windings 14, 15 to control both the suspending and lateral guiding of the core 3 secured to vehicle.

In this manner, supposing that there is no external force applied to the core 3 and there is no disturbing factor such as the abnormality in shape of the rail portion, the arrangement shown in FIG. 2(a) assures that the core 3, and hence the vehicle securing it, is kept at its neutral position with a predetermined vertical distance "d" and with a preselected horizontal distance "l" measured between the detector 13 and the armature rail 1, giving the relationship that F1l equals F2l in magnitude and has the same sense as that of F2l while F1g equals F2g in magnitude but has an opposite sense from that of F2g, as shown in FIG. 2(a) where F1l and F1g represent the vertical and horizontal components of the force F1 developed by the magnetic flux $\Phi 1$, respectively, and F2l and F2g represent the vertical and horizontal components of the force F2 developed by the magnetic flux $\Phi 2$, respectively. In the central leg 6 of the core 3 there exists an upwardly directed attractive force Fc developed by the magnetic flux $\Phi c$.

FIG. 2(b) shows one example of an electrical control circuit which may be used in the arrangement of FIG. 2(a). Firstly, description will be given as to the vertical gap control operation. An electrical signal from the detector 10 is subtractively combined with a reference signal from a gap setting device 1a, and the resultant difference signal is applied to a linear amplifier circuit 2a and a differential amplifier circuit 3a. Output signals from the amplifier circuits 2a, 3a are additively combined and the combined signal is applied to the current controllers 11, 12 to provide currents of the same magnitude in the windings 14, 15 on the side legs 14, 15 of the core 3. On the other hand, in order to effect guide control of the core 3 in the lateral direction, a difference signal between a signal from the detector 13 and that from a gap setting device 4a is applied to a linear amplifier circuit 5a and a differential amplifier circuit 6a. Output signals from the amplifier circuits 5a, 6a are additively combined and the combined signal is applied with negative sign to the current controller 11 and with positive sign to the current controller 12, and as a consequence, the current in one of the side leg windings of the core 3 is increased while the current in the other winding thereof is decreased.

A block designated by 7a and drawn in a phantom line in FIG. 2(b) shows an element for providing a signal which permits the system to take into account special factors to improve the stability thereof, such factors including the differentiation of second order of the signal representing the gap between the core 3 and the rail 1 or the gap between the detector 13 and the rail 1, the magnitude of the magnetic flux, the magnitude of energizing currents, the acceleration of the core 3, etc.

In the arrangement of FIG. 3(a) through (c), for clarification and simplification purposes, the electromagnet core 3 is shown assuming, as the intended position, its neutral position with respect to the armature rail. With the electromagnet core 3 in such intended position, a lateral control force will be actually produced in the following cases: i.e., (1) when an electrical signal is given to the gap setting device 1a or 4a, (2) when the core 3 has a velocity or acceleration component in the lateral direction, and (3) when the core 3 is deflected laterally by only a slight distance from its neutral position, but the linear amplifier circuits 2a, 5a have so high a gain as to sense even such a slight deflection, to vary the magnitude of input signals to the controllers 11, 12.

FIG. 3(a) shows such a condition of the electromagnet that there is a relatively large current flowing through the winding on the right side leg 5 of the core 3, while there exists substantially no current flowing through the winding on the left side leg 4 thereof. In FIG. 3(a), the lines of magnetic flux generated in the right side leg 5 define magnetic circuits respectively passing through the central legs 6, 9 and the left side legs 4, 7, then returning into the right side leg 5, in which condition a rightward control force having the magnitude of F2g−F1g is exerted on the electromagnet core 3. In order to make this control force further effective, an electric current may be permitted to flow in the winding on the left side leg 4 so that lines of magnetic flux of opposite sense as shown by broken lines in FIG. 3(b) are generated for cancelling the magnetic flux generated by the winding on the right side leg 5 of the core 3 and passing through the left side legs 4, 7 as shown in FIG. 3(a). Thus, the magnetic flux circuit of FIG. 3(b) may be superposed upon that of FIG. 3(a). The result of such superposition is shown in FIG. 3(c) in which it is seen that a stronger lateral control of the core 3 is effected by the force F2G.

In performing the lateral control of the core 3 with respect to the armature rail in this way, the lines of magnetic flux may be concentrated in one of the side legs of the core 3 with the result that there may be produced a rolling moment on the core 3 about an axis perpendicular to the plane of paper, but this problem may be solved by providing a row of electromagnets on each of the left and right sides of the vehicle (FIG. 1 shows such a case, although only one electromagnet core 3 on each side of the vehicle 2 can be seen therein), or by constituting the vehicle in a suspended form (as will be later described in conjunction with FIG. 5).

Although description has been given as to the case where there occurs a control force working in the right hand direction in conjunction with FIG. 3(a) through (c), the same description can also be applied to the case where such control force works in the left hand direction.

Also, with the arrangement according to the invention, even if the electromagnet core 3 has, as its intended position, a deflected position away from its neutral position, it is likewise possible to generate a control force in any desired lateral direction in addition to the afore-said automatic restoring force by the control of the energizing current supplied to the electromagnet windings, whereby it is possible to maintain the electromagnet core 3 at a desired position against an external force, or to deflect intentionally the core in any lateral direction, such features in operation being useful particularly in the switching operation of the vehicle, as will be further described hereinafter, and furthermore, it is possible to provide a dumping effect by applying an energizing current to the electromagnet windings so as to produce a control force which acts in the opposite direction to the lateral movement of the electromagnet which has a magnitude proportional to the lateral deflecting velocity of the electromagnet. Such lateral control function cannot be made available from the construction of an electromagnet wherein the width of the electromagnet core and that of the opposing armature rail are the same with each other, because it would be impossible for such construction of an electromagnet to provide an extra lateral control force other than the automatic restoring force which is generated when the electromagnet core is deflected away from its central position.

Although the above description given in conjunction with FIGS. 2 and 3(a) through (c) have been confined to an embodiment of the invention wherein the width of the electromagnet core is smaller than that of the armature rail, the operation and the technical effect produced by the construction of an electromagnet wherein the width of the electromagnet core is greater than that of the armature rail do not differ from those of the above said embodiment, excepting that the control of energizing currents in the side legs thereof is effected in an opposite manner. The greater the difference in width between the electromagnet core and the armature rail is, the greater the lateral control force becomes, but the more the electric power is required.

FIG. 4 shows another embodiment of the invention wherein there is provided an independent winding 16 on the central leg 6 of the electromagnet core 3 for controlling the vertical lifting attractive force applied to the vehicle and wherein the windings 14, 15 on the side legs of the core 3 are connected in series to each other for controlling the lateral force applied to the vehicle. The function and effect obtainable from the arrangement shown in FIG. 4 are similar to those obtainable from the arrangement shown in FIGS. 2 and 3(a) through (c). In the arrangement of FIG. 4, there is produced a lateral control force which corresponds to the direction and magnitude of the current flowing through the windings 14, 15 on the side legs of the electromagnet core 3. In FIG. 4, there are shown current controllers designated by 17 and 18 which have a similar function to the current controllers 11, 12 shown in FIG. 2.

FIG. 5 is a diagrammatic view, in vertical cross-section, showing the case where the invention has been applied to a suspended type of vehicle. In this arrangement, an electromagnet core 3 having a three-legged shape in cross section fixedly mounted on the upper side of a vehicle 2 is disposed in an opposing relationship to an armature rail 1 suspended from a support 20 erected on the ground, so that the vehicle 2 is caused to be electromagnetically suspended by the magnetic attractive force exerted on the core 3. There are provided protector devices 19 adapted to prevent the vehicle 2 from dropping down due to loss or lack of the suspending magnetic force during running of the vehicle 2.

FIG. 6(a) shows diagrammatically the arrangement of the armature rail in a switching area thereof for the suspended type of vehicle shown in FIG. 5, and FIG. 6(b) is a cross-sectional view taken along line A-A' in FIG. 6(a). FIG. 7(a) is a diagrammatic view similar to FIG. 6(a) showing a prior art armature rail as disclosed in Japanese Patent Application Public Disclosure No. 16322/1973 as referred to hereinbefore, and FIG. 7(b) is a cross sectional view taken along line B-B' in FIG. 7(a).

According to the construction of the armature rail according to this invention as shown in FIG. 6(a) and (b), it is possible to carry out the switching of the vehicle 2 in any desired branching direction through electrical control without the necessity of any particular switching means at the switching area. More particularly, when it is desired to switch the vehicle in the switching area to, for instance, the right branch rail as viewed in FIG. 6(a), it is only required to increase the magnetic flux density in the right side leg of the electromagnet core and at the same time temporarily put down the left side protector device 19 toward the left side before entry of the vehicle in the switching area. During such switching operation, the protective function of the left side protector device 19 is temporarily lost, but there is no danger of the vehicle falling down, because the right side protector device 19 is still effective in function. In contrast, in the prior art construction of electromagnet as shown in FIG. 7(a) and (b), it is impossible to switch the vehicle to any described branching direction without the provision of switching means.

More particularly, as seen from the rail arrangement shown in broken lines in FIG. 7(a), it is inevitably necessary to take off a relatively long part of the right side leg portion of the armature rail for straightforward travel of the vehicle, or to take off a relatively long part of the left side leg portion of the rail for a right turn of the vehicle, and, consequently, a lateral control force to be applied to the vehicle is lost during its passage through the switching area, and thus the electromagnet core with an inverted-T shape in cross section would come into contact with either one of the wall portions of the armature rail.

FIG. 8(a) shows an aspect of use as a mechanical brake of the armature rail according to the present invention. FIG. 8(b) and (c) show aspects of use as mechanical brakes of the armature rails having different cross sectional shapes from that of the invention, respectively. In FIG. 8(a) through (c), reference numeral "21" designates a brake element fixedly mounted on the electromagnet and the arrows indicate the areas of the rail against which brake shoes are pressed. For a magnetically suspended vehicle, such a mechanical brake mechanism is very important. The braking device as shown in FIG. 8(a) which is adapted to exert a braking force on both sides of the central leg portion of the armature rail is more advantageous in comparison with the other two types shown in FIG. 8(b) and (c): the braking device shown in FIG. 8(b) has the disadvantage that there might occur harmful vibrations due to deformation of the armature rail, while the braking device shown in FIG. 8(c) has the disadvantage that an eccentric moment of force might be produced in the electromagnet core during braking operation.

From the foregoing, it will be seen that according to this invention, there is provided effective control of a magnetically suspended or floated vehicle by using a single integrally constructed electromagnet for both suspending and lateral guiding operations, and that highly reliable suspending and guiding control can be achieved from the construction of a control system incorporating a relatively few components. Furthermore, in the arrangement according to the invention, the direction in which the magnetic fluxes generated by the electromagnet windings intersect the armature rail is substantially constant, and this is particularly useful when the vehicle is provided with a plurality of electromagnets disposed in a closely spaced relationship to one another along the length of the armature rail, because it reduces eddy currents produced in the armature rail portion on which the vehicle is running whereby the magnetic drag force applied to the vehicle is substantially reduced, and further no yawing moment of force is generated from the lateral control of the electromagnet core. Also, with the construction of the electromagnet core and armature rail according to the invention, there is no danger of the electromagnet core contacting with the armature rail side walls even if the rail is designed to have a large radius of curvature. Also, in the system according to the invention, the electromagnet core has an automatic restoring force even if lateral guiding control is not effected. Furthermore, the invention provides an advantageous feature in its application to a switching area of the armature rail, when it is applied to a suspended type of vehicle, and in addition, the armature rail has such a construction that a part thereof can be used to advantage as a mechanical brake for the vehicle.

Having described the foregoing embodiments of the invention, it is now evident to those skilled in the art that other embodiments incorporating its concept may be used. Therefore, it is to be understood that the invention should not be limited to such disclosed embodiments.

What is claimed is:

1. In an electromagnetic suspension and guide system wherein a vehicle is suspended and guided by an electromagnetic attractive force generated between an armature rail fixedly laid along a path on which the vehicle is to run and an electromagnet having a core fixedly mounted on the vehicle and wherein the vehicle thus suspended and guided is moved along the armature rail by a separate propelling means, the improvement characterized in that the armature rail and the core of said electromagnet have a three-legged shape in cross section the width of said armature rail being different than the width of said core, said armature rail and said core being disposed so that the three legs of the electromagnet core face the three legs of the armature rail with a gap therebetween, two side legs of the electromagnet core being provided with energizing windings wound thereon, so that one side leg of the electromagnet core forms a first closed loop magnetic circuit through at least a central leg of the core while the other side leg of the electromagnet core forms a second closed loop magnetic circuit through at least the central leg of the core, wherein the lateral movement of said core with respect to said armature rail is limited to wherein a side edge of said core is aligned with a corresponding side edge of said armature and, wherein the lateral guide position of the electromagnet core as well as the vertical gap between the electromagnet core and the armature rail can be controlled by controlling the energizing currents supplied to said windings.

2. An electromagnetic suspension and guide system according to claim 1 characterized in that said electromagnet core has a smaller width in cross section than the width of said armature rail.

3. An electromagnetic suspension and guide system according to claim 1 characterized in that said electromagnet core has a larger width in cross section than the width of said armature rail.

4. An electromagnetic suspension and guide system according to claim 1 characterized in that said energizing currents are supplied to said windings in accordance with the width of the vertical gap between the electromagnet and the armature rail and with the lateral position of the electromagnet relative to the armature rail.

5. An electromagnetic suspension and guide system according to claim 4 characterized in that there are provided a first gap detector means fixed to the electromagnet and adapted to detect the vertical gap between the electromagnet and the armature rail, a first operational amplifier circuit means connected to the first gap detector means, a second gap detector means fixed to the electromagnet and adapted to detect the lateral position of the electromagnet relative to the armature rail, a second operational amplifier circuit means connected to the second gap detector means, and a first and second current controller means respectively coupled to the windings on the two side legs of the electromagnet core, the output signal from said first and second operational amplifier circuit means being applied to both the first and second controller means for controlling the lateral guide position of the electromagnet and the vertical gap between the electromagnet and the armature rail.

6. An electromagnetic suspension and guide system according to claim 5 characterized in that the first operational amplifier circuit means is provided with a first gap setting means for setting a vertical reference position of the electromagnet and is adapted to respond to the difference between the signal representative of the detected vertical gap and the signal representative of the vertical reference set, and in that the second operational amplifier circuit means is provided with a second gap setting means for setting a lateral reference position of the electromagnet and is adapted to respond to the difference between the signal representative of the detected lateral position of the electromagnet and the signal representative of the lateral reference set.

7. An electromagnetic suspension and guide system according to claim 1 characterized in that the two side legs of the electromagnet core having said windings on said two side legs are connected in series with each other and wherein said energizing currents are applied thereto in accordance with the lateral position of the electromagnet relative to the armature rail, and in that the central leg of the electromagnet core has an independent winding wound thereon to which is supplied an energizing current in accordance with the width of the vertical gap between the electromagnet and the armature rail.

* * * * *